Patented Jan. 1, 1929.

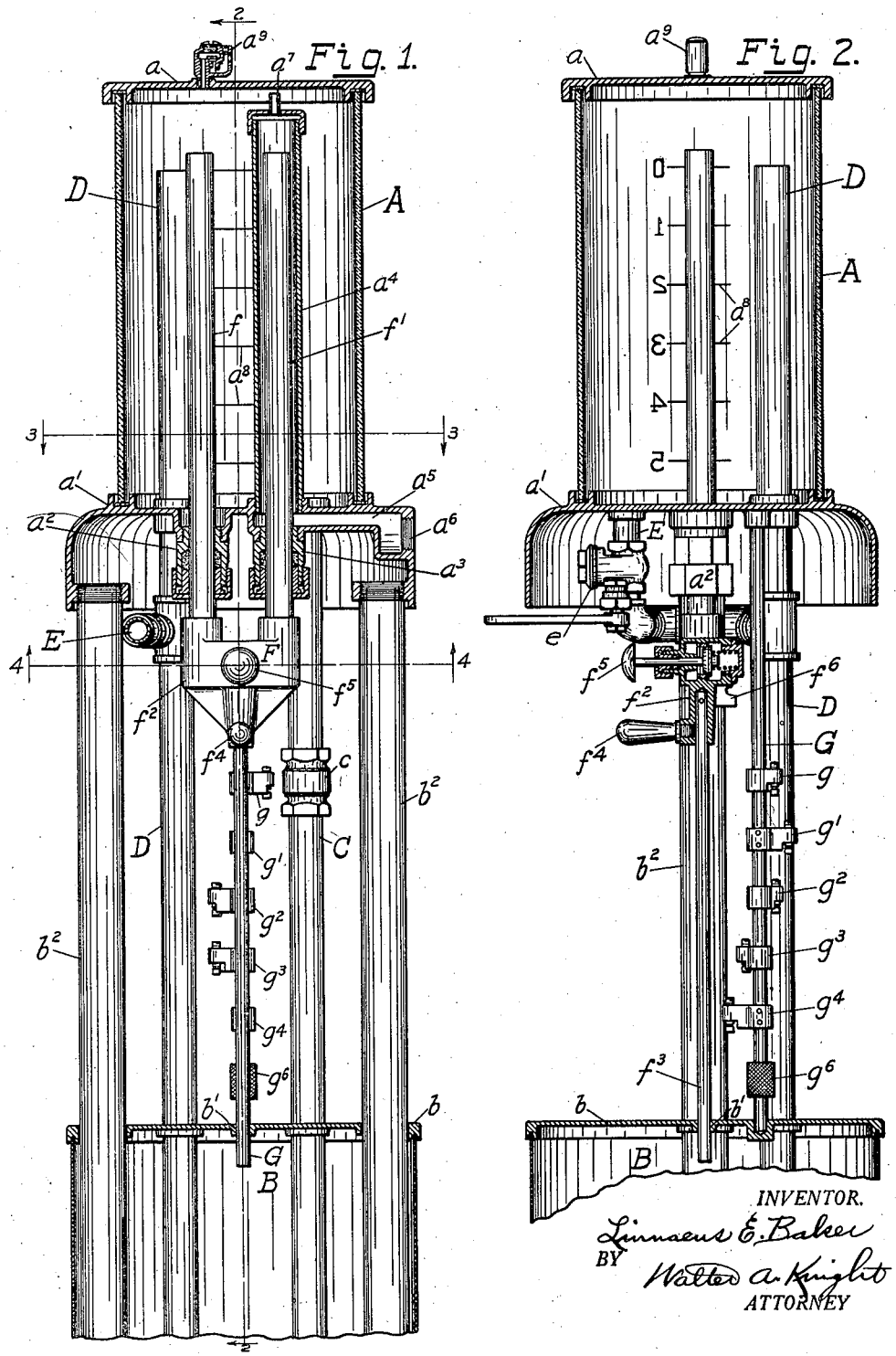

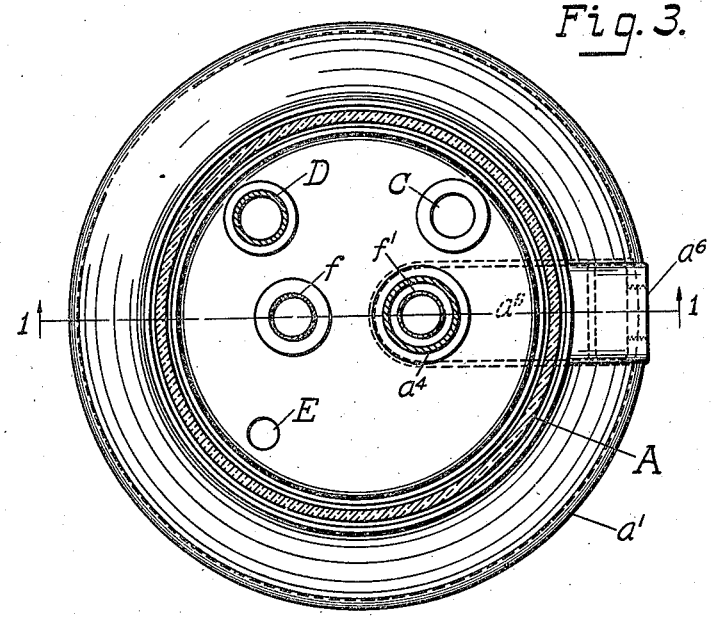
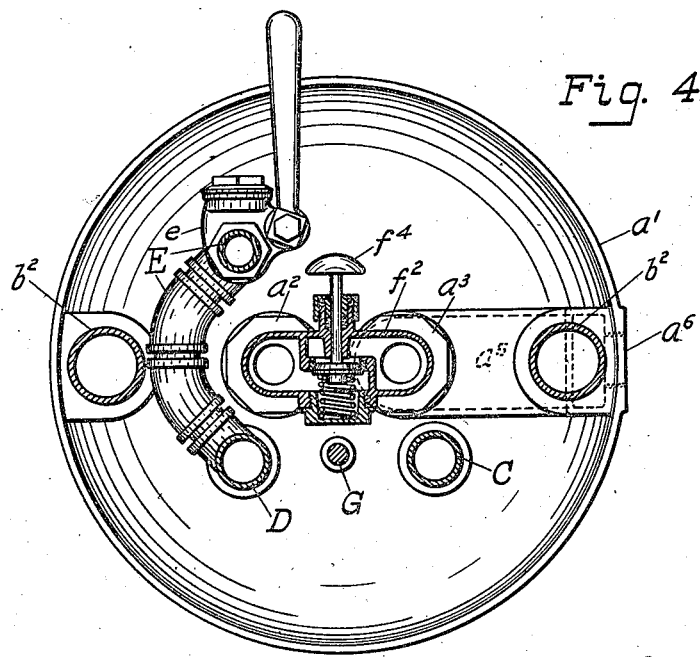

1,697,675

UNITED STATES PATENT OFFICE.

LINNAEUS E. BAKER, OF FORT WAYNE, INDIANA, ASSIGNOR TO WAYNE COMPANY, OF FORT WAYNE, INDIANA, A CORPORATION OF INDIANA.

LIQUID MEASURING AND DISPENSING APPARATUS.

Application filed July 24, 1924. Serial No. 727,986.

My invention relates to liquid measuring and dispensing apparatus of the so-called visible type used particularly in selling gasoline.

Broadly speaking, there are three types of so-called visible apparatus of this character, as follows:—

(1) A visible container adapted to be filled to the point desired by manipulation of a valve on the fill pipe, or filled so full that excess liquid flows back through a fixed drain-back pipe to the level of the maximum number of units that may be dispensed without refilling the visible container. These containers usually hold five or ten gallons. If the whole contents are to be dispensed at one time the container is filled, the serve valve is opened and remains open until the visible container is drained. If part only of the contents is to be dispensed, as three gallons from a five gallon container, the container is filled, the serve valve is opened and left open until the operator observes that the liquid in the container has drained out so that the surface of the liquid is level with the graduation indicating that three gallons have been dispensed, when he closes the valve. Obviously correct measurement of the liquid dispensed depends upon the honesty, close attention and skill of the operator.

(2) A visible container adapted to be filled to a level above that of the maximum quantity to be dispensed at one filling of the container, and an adjustable drain-back tube open at its upper end, adapted to drain back to the source of liquid supply all liquid in the container above that of the quantity for which the said tube is set. Then with the drain-back tube remaining in said position the serve valve is opened and left open until all the liquid is drained from the container. In a properly constructed apparatus such measurement, upon complete draining, is accurate. If for any reason the operator desires to discontinue dispensing liquid before the visible container is drained, as on a five gallon setting when three gallons have been dispensed, he must make his measurement solely by observation of the liquid level in relation to the graduation of the container, as in case 1; and with the same uncertainty of accurate measurement of the liquid dispensed. If the whole quantity dispensed on the original setting is insufficient to fill the vessel into which the liquid is to be drawn, as the tank of an automobile, then more liquid must be fed into the visible container on a new setting. Suppose the customer guesses that his tank will hold two gallons more, the new setting is for two gallons. This is dispensed but the tank will hold still more and the customer wants it filled. He now guesses that it will hold one more gallon. The third setting is for one gallon, and so on. All this takes up much time which neither the operator nor the customer can afford at rush hours; but each measurement will be accurate.

(3) A visible container provided with a fixed drain-back pipe and adapted to be filled to above the level of said pipe. It is also provided with an adjustable tube on the serve side of the apparatus so that if from a five gallon container the purchaser desires to buy two gallons of liquid, the container may be filled, the adjustable tube brought down to the proper level, the serve valve opened and the liquid drained from the container to that level. If the customer then says "give me another gallon," the tube is lowered accordingly and the additional gallon dispensed, and so on until the customer's tank is filled or the container is empty, without refilling the container in whole or in part; and each measurement is accurate.

Such an apparatus if properly constructed always accurately measures the liquid dispensed and may be operated under all conditions without wasting time.

My invention belongs to this third class of measuring and dispensing apparatus. However, each of the measuring and dispensing apparatuses of this third class, with which I am familiar, has one of two faults that will permit the giving of false measure if improperly operated, viz:—

Either there is a space hidden from the view of the customer, between the upper end of the adjustable tube, which in this case is the inlet end, and the serve valve, so that when the said valve is closed slightly sooner than it should be for complete draining of the liquid to be dispensed to the customer's tank, liquid is trapped in said space and does not flow out, so the customer receives short measure.

Or there is a space hidden from the view of the customer, between the end of the adjustable tube, which in this case is the outlet end, and the serve valve, which space must always be left full to insure accurate measurement of the liquid dispensed. The liquid in said space is drained back to the source of supply to the level of the drain opening. The next customer would receive short measure by the amount so drained back, which amount necessarily would be supplied to refill the said space from the next liquid fed.

Whenever in such an apparatus the liquid in the visible container is lowered below that in the outlet end of the adjustable serve tube, as by draining back the contents of the visible container to the source of liquid supply, or, after serving, by elevating the upper end of the adjustable tube to a position higher than the level of the liquid in the container, the serve valve may be opened, wholly or partially emptying the contents of the space back into the visible container. The next customer will receive short measure by the amount so drained back.

The principal object of my invention is to provide a new and improved apparatus of the character indicated, which will measure with accuracy different desired quantities of the liquid to be dispensed, it being possible to dispense a plurality of separate quantities, the sum of which is within the capacity of the container without re-filling said container.

Another object of this invention it to prevent short measure. With my invention it is possible to place the chamber within which the tube is adjusted inside the visible container.

The particular embodiment of my invention selected for illustration is shown in the accompanying drawings, in which:—

Figure 1 is a gasoline measuring and dispensing apparatus in vertical section on the line 1—1 of Fig. 3 as though there shown in full, the moving parts being shown in full, but with the bottom portions of the casing, supply pipe and overflow pipe broken away.

Fig. 2 is a vertical section on the line 2—2 of Fig. 1 as though there shown in full, the guide rod being shown in full, and still more of the bottom portions of the casing and pipes being broken away, Fig. 3 is a horizontal cross-section on the line 3—3 of Fig. 1, as though there shown in full, and Fig. 4 is a horizontal cross-section on the line 4—4 of Fig. 1, as though there shown in full.

Referring now to the drawings, A is the elevated visible container, made of glass or other transparent material, with top $a$, vented at $a^9$, and a bottom $a^1$. The container A is provided with graduations $a^8$ to indicate by the level of the liquid being dispensed from said container the number of gallons served.

The structure is provided with a suitable base B and supports $b^2$, $b^2$.

Gasoline is forced from the source of supply, not shown, by any suitable means, not shown, through the fill pipe C into the visible container A, filling it. Return flow is prevented by the check valve $c$. Excess liquid in container A is drained back to the source of supply through the open-ended over-flow pipe D, terminating on a level with the zero graduation on the scale.

All liquid can be drained from the container A to the over-flow pipe D through the drain-back pipe E controlled by the valve $e$. With the level of the liquid standing at the maximum serving level, that is zero, five gallons in this apparatus, the operator is ready to serve gasoline to a customer.

Through the container bottom $a^1$ extend the two parallel upright branches of a U-tube F. These branches preferably terminate above at substantially the same height. One of these branches $f$ is the inlet end of the U-tube, extending through a stuffing box $a^2$ up into the container A, and is open ended at the top to allow liquid to flow into it from the contents of the container. The other branch $f^1$ is the outlet end of the U-tube, is open ended and extends through a stuffing box $a^3$ up into the container A, within a leak-tight chamber formed by the casing $a^4$ with which it telescopes. These uprights $f$ and $f^1$ terminate below the stuffing boxes $a^2$, $a^3$ in a connecting member $f^2$, which forms the bottom of the U-tube, and with the uprights $f$, $f^1$ forms a continuous conduit for the flow of liquid from the container A down through the tube $f$, over through the connecting member $f^2$, up through the tube $f^1$, out into the chamber $a^4$ whence it passes through the annular space formed by the inner wall of $a^4$ and the outer wall of $f^1$, through the cored passage $a^5$ to the discharge outlet $a^6$, with which the serving hose, not shown, is connected.

A vent hole $a^7$ is provided in the top of the chamber $a^4$ to maintain atmospheric pressure at all times in the air spaces in the tops of the container A and the casing $a^4$ to insure the U-tube element always remaining full of gasoline.

To the bottom of the connecting member $f^2$ is secured a guide rod $f^3$ parallel with the tubes $f$ and $f^1$. This rod is guided through hole $b^1$ in the head $b$ of the base B, and a handle $f^4$ is provided to facilitate the vertical adjustment of the U-tube member. A valve $f^5$ in the connecting member $f^2$ keeps the passage between the lower ends of the tubes $f$ and $f^1$ normally closed, and this passage may be opened by manipulation of said valve.

Quantity stop mechanism of any convenient form is provided to limit the downward movement of the U-tube member. The mechanism shown consists of a quantity stop rod G with knurled handle $g^6$ by which it is rotated, and stops $g$, $g^1$, $g^2$, $g^3$ and $g^4$ thereon to limit the depression of the U-tube element by contact with the lug $f^6$ so as to limit the quantity of gasoline dispensed to 1, 2, 3, 4 or 5 gallons respectively.

After the apparatus has been once used to serve liquid the U-tube member is always entirely full of gasoline thereafter.

The operation of the apparatus is as follows:—

Assume that the particular apparatus has never been put in use; force gasoline into container A until it is full, the U-tube member being in any position desired, for instance, in the position shown in Fig. 1. The inlet branch $f$ and the contiguous side of the connecting member $f^2$ will fill with gasoline to the valve $f^5$. Then open valve $f^5$ and lower the U-tube until the outlet branch $f^1$ is filled with gasoline and overflows into the chamber formed by the casing $a^4$ and through the cored passage $a^5$ to the outlet $a^6$ to which the hose is connected. The U-tube F being now full of gasoline let us suppose that a customer comes and orders three gallons of gasoline. The container A may be filled, that is until when all excess gasoline has been run back to storage through the fixed over-flow pipe D, the top level of the gasoline in the container A stands at O, that is, showing there are five gallons in the container A ready to be served. The operator grasps the knob $g^6$ and rotates the stop rod G until the stop $g^2$ lies in the vertical path of the lug $f^6$. Then the operator grasps the handle $f^4$ and lowers the U-tube F until the lug $f^6$ contacts with the stop $g^2$ and will not permit the U-tube to be lowered further. The operator now opens the valve $f^5$ and holds it open until the gasoline has drained out through the hose to the customer's tank, so that the top level of the gasoline in the container is at 3 on the scale. If the customer then orders another gallon the stop rod G is rotated until the stop $g^3$ is in the path of the lug $f^6$. The U-tube is further lowered until said lug contacts with said stop. The valve $f^5$ is again opened and held open until another gallon has been served; and so on.

When the container A is to be drained back to storage the U-tube may be left in any position, the valve $e$ is opened and kept open until the gasoline in the container A has all drained back through the drain-back pipe E into the over-flow pipe D. The U-tube always remains full of gasoline.

Obviously many changes may be made in this apparatus without departing from the spirit of my invention, as by way of illustrations and by no means as a complete enumeration:—by locating the casing within which the outlet branch of the U-tube terminates outside the container, by omitting the valve in the U-tube, or, if the container is filled by a measuring pump, the fixed drain-back pipe may be eliminated. If the valve in the U-tube is omitted, it does not affect the accuracy of measurement attained, and as so constructed the flow of liquid being dispensed may at any time be quickly arrested by elevating the U-tube.

I claim as my invention and desire to secure by Letters Patent of the United States:—

1. In combination with a liquid measuring and dispensing apparatus having an elevated container from which liquid is dispensed, a casing through which the liquid dispensed passes, a rigid vertically adjustable U-tube whose branches are open at the top, one branch terminating within said container to receive liquid therefrom and the other within said casing to deliver liquid thereinto, and means for equalizing the pressures on the surfaces of the liquid in the open ends of said U-tube.

2. In combination with a liquid measuring and dispensing apparatus having an elevated container from which liquid is dispensed, a casing through which the liquid dispensed passes, a vertically adjustable U-tube whose branches are open at the top, one branch terminating within said container to receive liquid therefrom and the other within said casing to deliver liquid thereinto, a valve in said U-tube to control the flow of liquid therethrough, and means for equalizing the pressures on the surfaces of the liquid in the open ends of said U-tube.

3. In combination with a liquid measuring and dispensing apparatus having an elevated container from which liquid is dispensed, a fixed casing through which the liquid dispensed passes, a rigid vertically adjustable U-tube whose branches are open at the top, one branch terminating within said container to receive liquid therefrom and the other within said casing to deliver liquid thereinto, means by which said U-tube may be raised and lowered, stop mechanism to control the extent to which said U-tube shall be lowered to insure the dispensing of the quantity of liquid desired, and means for equalizing the pressures on the surfaces of the liquid in the open ends of said U-tube.

4. In combination with a liquid measuring and dispensing apparatus having an elevated container from which liquid is dispensed, a casing through which the liquid dispensed passes, a vertically adjustable U-tube whose branches are open at the top, one branch terminating within said container to receive liquid therefrom and the other within said casing to deliver liquid thereinto, a conduit connecting the bottom of the chamber in said casing with the liquid delivery outlet from said apparatus, and means for equalizing the pressures on the surfaces of the liquid in the open ends of the said U-tube.

5. In combination with a liquid measuring and dispensing apparatus having an elevated transparent container from which liquid is dispensed, means for delivering liquid into said container, means for draining back the excess liquid from said container, means for completely draining the contents of said container to the source of supply, a casing through which the liquid dispensed passes, rigid vertically adjustable U-tube whose branches are open at the top, one branch terminating within the said container to receive liquid therefrom and the other within said casing to deliver liquid thereinto, a stuffing box at the bottom of the container through which one branch of the U-tube passes, a stuffing box at the bottom of the said casing through which the other branch of the U-tube passes, and means for equalizing the pressures on the surfaces of the liquid in the open ends of said U-tube.

6. In combination with a liquid measuring and dispensing apparatus having an elevated container from which liquid is dispensed, a fixed casing through which the liquid dispensed passes, a rigid vertically adjustable U-tube whose branches are open at the top, one branch terminating within said container to receive liquid therefrom and the other within the casing to deliver liquid thereinto, means for guiding said U-tube, and means for equalizing the pressures on the surfaces of the liquid in the open ends of said U-tube.

7. In combination with a liquid measuring and dispensing apparatus having an elevated container from which liquid is dispensed, a casing through which the liquid dispensed passes, a rigid vertically adjustable U-tube whose branches are open at the top, one branch terminating within said container to receive liquid therefrom and the other within said casing to deliver liquid thereinto, a valve in said U-tube to control the flow of liquid therethrough, means by which said U-tube may be raised and lowered, stop mechanism to control the extent to which said U-tube shall be lowered to insure the dispensing of the quantity of liquid desired, and means for equalizing the pressures on the surfaces of the liquid in the open ends of said U-tube.

8. In combination with a liquid measuring and dispensing apparatus having an elevated container from which liquid is dispensed, a fixed casing through which the liquid dispensed passes, a rigid vertically adjustable U-tube whose branches are open at the top, one branch terminating within said container to receive liquid therefrom and the other within said casing to deliver liquid thereinto, valve means for controlling the flow of liquid so dispensed, a conduit connecting the bottom of the chamber in said casing with the liquid delivery outlet from said apparatus, and means for equalizing the pressures on the surfaces of the liquid in the open ends of said U-tube.

9. In combination with a liquid measuring and dispensing apparatus having an elevated container from which liquid is dispensed, a casing through which the liquid dispensed passes, a rigid vertically adjustable U-tube whose branches are open at the top, one branch terminating within said container to receive liquid therefrom and the other within said casing to deliver liquid thereinto, a valve in said U-tube to control the flow of liquid therethrough, means by which said U-tube may be raised and lowered, stop mechanism to control the extent to which said U-tube shall be lowered to insure the dispensing of the quantity of liquid desired, a conduit connecting the bottom of the chamber in said casing with the liquid delivery outlet from said apparatus, and means for equalizing the pressures on the surfaces of the liquid in the open ends of said U-tube.

10. In combination with a liquid measuring and dispensing apparatus having an elevated container from which liquid is dispensed, a casing through which the liquid dispensed passes, a rigid vertically adjustable U-tube whose branches are of substantially the same height and open at the top, one branch terminating within said container to receive liquid therefrom and the other within said casing to deliver liquid thereinto, a valve in said U-tube to control the flow of liquid therethrough, means for guiding said U-tube, and means for equalizing the pressures on the surfaces of the liquid in the open ends of said U-tube.

11. In combination with a liquid measuring and dispensing apparatus having an elevated container from which liquid is dispensed through a chamber formed by a casing and thence to the discharge opening, a rigid vertically adjustable U-shaped element forming a conduit between said container and said chamber, the branches of said U-shaped element being open at the top.

12. In combination with a liquid measuring and dispensing apparatus having an elevated container from which liquid is dispensed, a casing within said container through which the liquid dispensed passes, a vertically adjustable U-tube whose branches are open at the top and substantially of the same height, one branch terminating within said container to receive liquid therefrom and the other within said casing to deliver liquid thereinto, and means for equalizing the pressures on the surfaces of the liquid in the open ends of said U-tube.

13. In combination with a liquid measuring and dispensing apparatus having an elevated container from which liquid is dispensed, a casing within said container through which the liquid dispensed passes, a vertically adjustable U-tube whose branches are open at the top, one branch terminating within said container to receive liquid therefrom and the other within said casing to deliver liquid thereinto, valve means for controlling the flow of liquid so dispensed, and a vent opening from the air space in the casing to the air space in said container.

14. In combination with a liquid measuring and dispensing apparatus having an elevated container from which liquid is dispensed, a casing extending from the bottom of and upwardly into said container through which the liquid dispensed passes, a vertically adjustable U-tube whose branches are open at the top, one branch terminating within said container to receive liquid therefrom and the other within said casing to deliver liquid thereinto, valve means for controlling the flow of liquid so dispensed, means by which said U-tube may be raised and lowered, stop mechanism to control the extent to which said U-tube shall be lowered to insure the dispensing of the quantity of liquid desired, a conduit connecting the bottom of the chamber in said casing with the liquid delivery outlet from said apparatus, and a vent opening through a top part of said casing wall to connect the air spaces in said casing and container.

15. In combination with a liquid measuring and dispensing apparatus having an elevated container from which liquid is dispensed, a casing within said container through which the liquid dispensed passes, a rigid vertically adjustable U-tube whose branches are open at the top and of substantially the same height, one branch terminating within said container to receive liquid therefrom and the other within said casing to deliver liquid thereinto, a valve in said U-tube to control the flow of liquid therethrough, means by which said U-tube may be raised and lowered, a stop mechanism to control the extent to which said U-tube shall be lowered to insure the dispensing of the quantity of liquid desired, a stuffing box at the bottom of the container through which one branch of the U-tube passes, a stuffing box at the bottom of the casing through which the other branch of the U-tube passes, separate means for guiding said U-tube, a conduit connecting the bottom of the chamber in said casing with the liquid delivery outlet from said apparatus, and means for equalizing the pressures on the surfaces of the liquid in the open ends of said U-tube.

In testimony whereof I have hereunto set my hand.

LINNAEUS E. BAKER.